(12) United States Patent
Heineke et al.

(10) Patent No.: US 11,297,909 B2
(45) Date of Patent: Apr. 12, 2022

(54) HOLDING DEVICE AND METHOD FOR RELEASING A SNAP-IN CONNECTION

(71) Applicant: SFS intec Holding AG, Heerbrugg (CH)

(72) Inventors: Kai Heineke, Bad Teinach/Zavelstein (DE); Marlon Wagner, Altensteig (DE); Philipp Gentner, Weinsberg (DE)

(73) Assignee: SFS intec Holding AG, Heerbrugg (CH)

( * ) Notice: Subject to any disclaimer, the term of this patent is extended or adjusted under 35 U.S.C. 154(b) by 175 days.

(21) Appl. No.: 16/745,523

(22) Filed: Jan. 17, 2020

(65) Prior Publication Data

US 2020/0229549 A1   Jul. 23, 2020

(30) Foreign Application Priority Data

Jan. 17, 2019   (EP) .................................... 19152219

(51) Int. Cl.
*A44B 17/00* (2006.01)
*B64C 1/00* (2006.01)

(52) U.S. Cl.
CPC ............ *A44B 17/0017* (2013.01); *B64C 1/00* (2013.01); *A44D 2201/32* (2013.01); *A44D 2203/00* (2013.01)

(58) Field of Classification Search
CPC ......... Y10T 24/45717; Y10T 24/45874; Y10T 24/32; Y10T 24/45461; Y10T 24/45466; F16B 21/073; F16B 21/065; F16B 21/071; F16B 2001/0035; A44D 2203/00; A44D 2201/32; A44B 17/0017; E05B 73/0052; E05B 73/0058
See application file for complete search history.

(56) References Cited

U.S. PATENT DOCUMENTS

| | | | |
|---|---|---|---|
| 3,638,285 A * | 2/1972 | Sanchez Giraldez ... | F16B 12/26 24/108 |
| 4,651,136 A | 3/1987 | Anderson et al. | |
| 4,987,754 A * | 1/1991 | Minasy ............... | E05B 73/0017 70/276 |
| 5,076,623 A * | 12/1991 | Richards ............. | E05B 47/0038 292/251.5 |

(Continued)

FOREIGN PATENT DOCUMENTS

| | | |
|---|---|---|
| CN | 107044472 | 8/2017 |
| CN | 108105236 | 6/2018 |
| DE | 102006060074 | 6/2008 |

*Primary Examiner* — Robert Sandy
(74) *Attorney, Agent, or Firm* — Volpe Koenig

(57) ABSTRACT

A holding device (10) for holding a component (12), the holding device (10) being convertible from a component holding mode into a component release mode by magnetic force. The holding device (10) for holding the component (12) has a movable detent element (14), the position of which is not influenced by the magnetic force. A method for releasing a snap-in connection between a holding device (10) and a component (12) is also provided, having the following steps: generating a magnetic field in the vicinity of the holding device (10); and applying a force that moves the holding device (10) and the component (12) apart from each other to release the snap-in connection.

13 Claims, 3 Drawing Sheets

(56) References Cited

U.S. PATENT DOCUMENTS

| | | | | |
|---|---|---|---|---|
| 5,600,977 | A * | 2/1997 | Piron | E05B 67/063 |
| | | | | 24/704.1 |
| 8,156,628 | B2 * | 4/2012 | Roth | E05B 65/006 |
| | | | | 29/426.1 |
| 9,307,797 | B2 * | 4/2016 | Sanchez Giraldez | A41F 1/002 |
| 10,522,519 | B2 * | 12/2019 | Ryu | G09F 9/3026 |
| 2008/0143030 | A1 | 6/2008 | Roth | |

* cited by examiner

HOLDING DEVICE AND METHOD FOR RELEASING A SNAP-IN CONNECTION

INCORPORATION BY REFERENCE

The following documents are incorporated herein by reference as if fully set forth: European Patent Application No. 19152219.2, filed Jan. 17, 2019.

TECHNICAL FIELD

The invention relates to a holding device for holding a component, the holding device being convertible from a component holding mode into a component release mode by magnetic force, and a method for releasing a snap-in connection.

BACKGROUND

A holding device of the above-noted type is known from the German published patent application DE 10 2006 060 074 A1. In the solution proposed there, detent element are provided in the form of ferromagnetic half-ring-shaped metal disks, which are tiltably supported spring-loaded such that they latch into an annular groove of the component to be held when a connection is made. In order to release the connection, the solution known from DE 10 2006 060 074 A1 provides for the component to be pressed against the holding device by manually applying force, as a result of which the component moves somewhat further into the holding device and, at the same time, is to exert a magnetic force on the half-ring-shaped metal disks through the approach of a magnet so that they tilt such that they come out of the annular groove. The component can be removed from the holding device after this has been done. This solution has some disadvantages. For example, there must be a certain clearance between the holding device and the component so that the component can be pressed further into the holding device to be released. In addition, the component is completely unsecured after coming out of the half-ring-shaped metal disks, which means that in the worst case, it can fall off when the component is let go from the annular groove after the half-ring-shaped metal disks have come out.

SUMMARY

The invention is therefore based on the object of specifying a generic holding device which can hold a component without clearance in relation to its approach direction when making the connection, the connection being intended to be releasable in component release mode, but without completely letting go of the component.

This object is achieved by a device having one or more features of the invention. Advantageous further developments and refinements of the invention are described below and in the claims.

In the holding device according to the invention, it is provided for it to have movable detent element for holding the component, the position of which detent element is not influenced by the magnetic force. Thus, even after the holding device has been converted to the component release mode, the detent element initially remain in position latched into the component and only unlatches when the component is removed from the holding device. Since the detent element is not moved by the magnetic force, it is also not necessary to make a corresponding free moving space by pressure on the component.

To enable this, it is preferred for the holding device to have a locking element which inhibits movement of the detent element in the component holding mode in an inhibited position and which releases a movement of the detent element in the component release mode in a release position. Thus, according to the invention, the locking element is moved by the magnetic force instead of the detent element.

Although an indirect drive of the locking element is of course also within the scope of the invention, for example, via a ferromagnetic element articulated on the locking element, it is preferred for the locking element to consist of ferromagnetic material, at least in sections. A direct drive is thus possible and the number of required components can be minimized.

Furthermore, it is considered advantageous for the holding device to have a spring element which pretensions the locking element in the direction of its inhibited position. The movement of the locking element into its release position caused by the magnetic force then takes place counter to the spring force of the spring element. This ensures that the locking element is located in its inhibited position without any magnetic force acting on it, and thus reliably preventing an unwanted coming out of the detent element in the component holding mode.

It has proven to be particularly advantageous when the detent element is elastically deformable at least in sections. For example, the detent element can comprise a plurality of detent fingers made of plastic arranged on a common detent element base plate, which is elastically deformable in the desired manner. The person skilled in the art recognizes that the rigidity of the detent element determines the force that is required to remove the component in the component release mode.

According to a preferred embodiment of the invention, it is provided that the holding device has a housing in which the detent element is arranged with clearance in a direction that runs perpendicular to an approach direction with which the component is approached on the holding device. Such a clearance can be used to compensate for tolerances.

Furthermore, it can be advantageous when the holding device has a housing in which the detent element is arranged, and that a damping element is provided between the housing and the detent element. In this way, for example, an at least partial sound decoupling can be achieved between the housing (and a further component with which it is associated) and the component.

If necessary, it can be provided for the holding device to have a housing and for the locking element to rest against the housing in its inhibited position. This solution is particularly useful without being limited to this when the above-mentioned clearance is provided in the direction running perpendicular to an approach direction, since the locking element is then fixed in its inhibited position with respect to the housing, by which, for example, undesirable rattling noises can be prevented. The system does not necessarily have to be flat. For example, the locking element can have tooth-like projections in the corresponding regions opposite the housing, which projections are brought into contact with the housing to fix the locking element.

According to another development of the invention, it is provided for the holding device to switch without magnetic force and non-destructively from the component holding mode into the component release mode when a force that exceeds a predetermined threshold value acts between the component and the detent element. This creates the function of an overload protection which, for example, prevents the anchoring of the housing from being torn out of an aircraft wall element to which it is anchored when excessive tensile forces occur. It is clear to the person skilled in the art that the predetermined threshold value is set, for example, by the selection of the detent and contact surfaces, the selection of the respective angles of these surfaces, the selection of any spring forces, and so on, to name just a few possible parameters.

The above-mentioned object is also achieved by a method for releasing a snap-in connection between a holding device, in particular a holding device according to the invention, and a component when the following steps are provided: generating a magnetic field in the vicinity of the holding device; and applying a force that moves the holding device and the component apart from each other to release the snap-in connection. This is because even with this solution, the detent element making the snap-in connection only comes out with the removal of the component, and a prior pressing of the component is not necessary, which is why no corresponding clearance need be present.

Similar to the holding device according to the invention, it can also be advantageous here for a magnetic force to be exerted by the magnetic field, which magnetic force converts a locking element from an inhibited position, in which it inhibits a movement of detent element, into a release position, in which it releases the movement of the detent element.

Also within the scope of the method according to the invention, it is preferred for the locking element to be converted from the inhibited position into the release position against a spring force. In other words, the locking element is held securely in its inhibited position by a spring element as long as no corresponding magnetic force acts.

For the method according to the invention, it is considered advantageous for the detent element to be elastically deformed when the connection is released, when the locking element is located in its release position and the force that moves the holding device and the component apart from each other is applied. The forces to be applied can again be determined by suitable design of, for example, plastic detent fingers, wherein other design parameters naturally also play a role.

Although the use of permanent magnets is also possible, at least in some embodiments of the method according to the invention, it can be provided for the magnetic field to be generated by an electromagnet which is activated to release the connection. Such an electromagnet can, for example, be integrated into a work glove. In this way, it can in particular be ensured that any holding devices are not inadvertently brought into a component release mode by inadvertently approaching a permanent magnet. It is also possible to only cause a component release mode when the electromagnet is already perfectly positioned at a desired point in time. For example, when dismantling particularly heavy components that have to be held by several people. If necessary, a plurality of holding devices can also be put into the component release mode synchronously by the synchronous activation of a plurality of correctly positioned electromagnets.

Although the method according to the invention is not limited to this, it can be used particularly in the field of vehicle construction and in particular in the field of aircraft construction, wherein the holding device is part of a first aircraft component (for example, an inner wall element) and the component is part of a second aircraft component (for example, a frame). The term "component" is to be interpreted broadly, and all conceivable construction and fastening variants come into consideration, for example, integrated construction, gluing, welding, screwing, riveting, to name just a few possibilities.

BRIEF DESCRIPTION OF THE DRAWINGS

Embodiments of the invention are explained in more detail below with reference to the accompanying drawings. Shown are.

DETAILED DESCRIPTION

Figure 1:
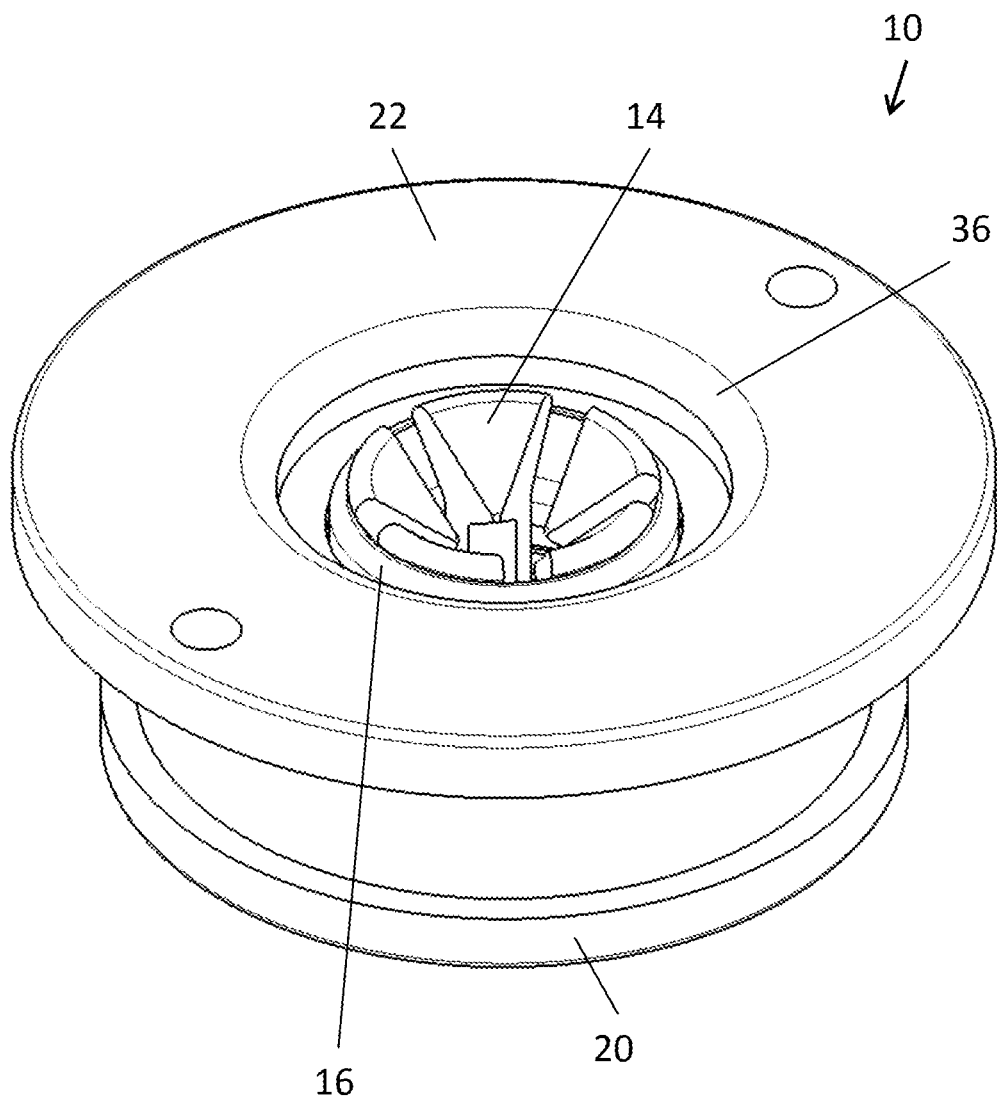
FIG. 1 a perspective illustration of an embodiment of a holding device according to the invention, which can also be used in the scope of the method according to the invention.
Figure 2:
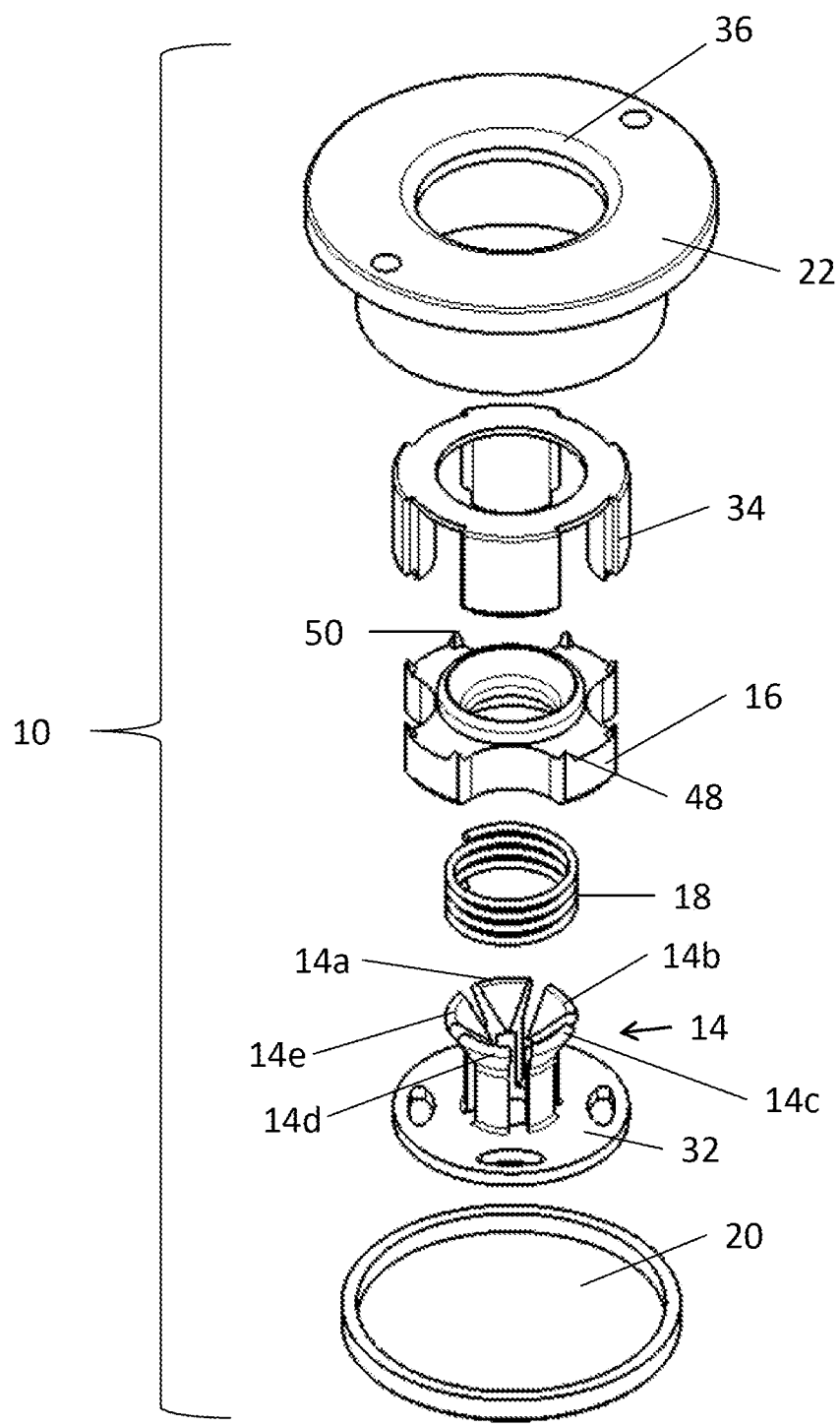
FIG. 2 an exploded perspective view of the holding device of FIG. 1.
Figure 3:
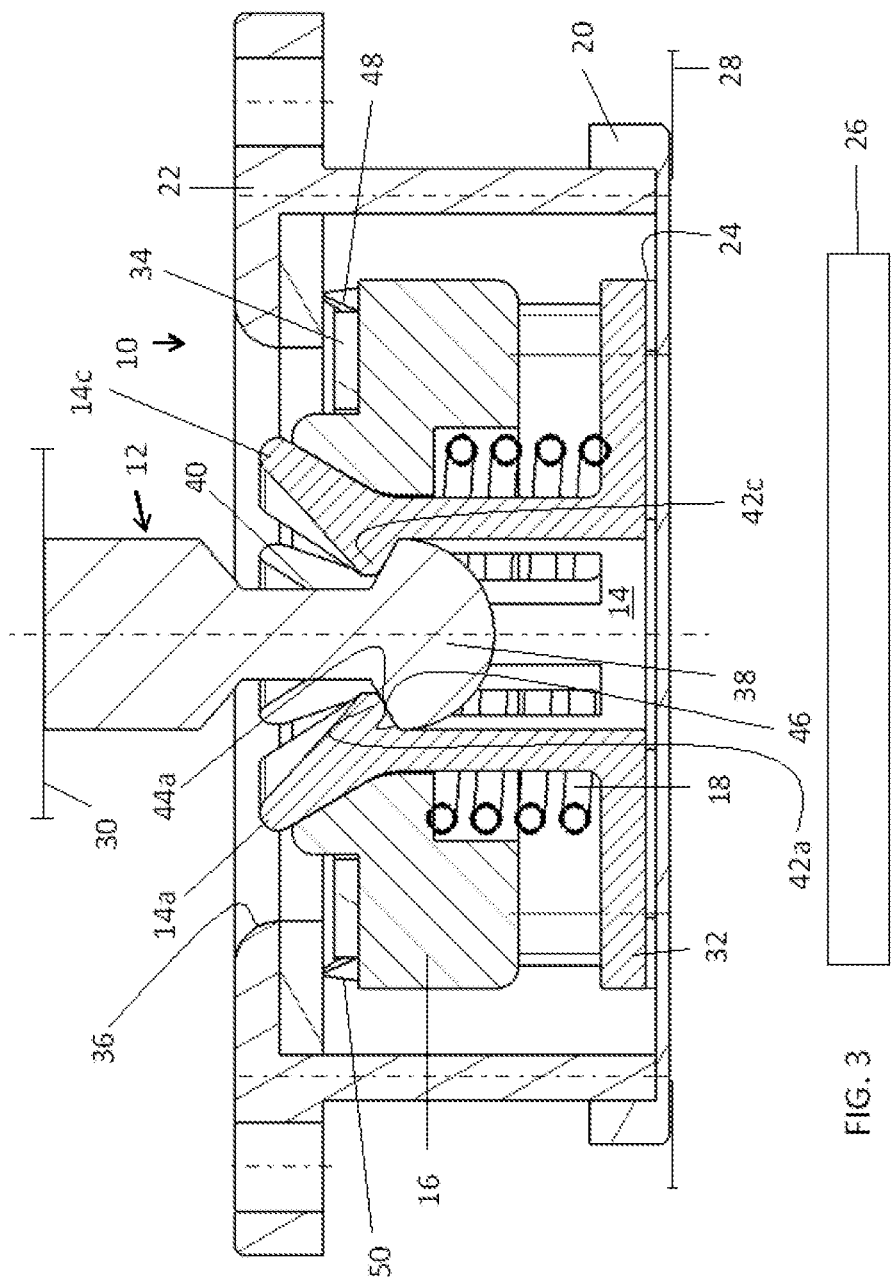
FIG. 3 a sectional view of the holding device of FIG. 1 with a held component, in the component holding mode.

Reference is made jointly to FIGS. 1 to 3 in the following description of the drawings.

The holding device 10 illustrated is intended to connect a first aircraft component 28, only schematically indicated in FIG. 3, to which the holding device 10 is fastened, to a second aircraft component 30, also only schematically indicated in FIG. 3. The second aircraft component 30 comprises the component 12, which in turn has a pin 38. As can be seen in FIG. 3, the pin 38 has an annular groove 40 having oblique groove walls. The lower end section of the pin 38 is designed hemispherical, which, as explained in more detail below, facilitates the making of the connection, more precisely the snap-in connection.

The holding device 10 comprises a housing base 20 and a housing cover 22 having a cover opening 36, which makes it possible to access a detent element 14 which is provided to latch into the annular groove 40. The detent element 14 preferably comprises a detent element base plate 32, from which five detent fingers 14a-14e, which are arranged in a circle, extend vertically upward in the embodiment illustrated. The five detent fingers 14a-14e thus form a kind of round cage, or a multi-slit cup, depending on the point of view. The upper, free ends of the detent fingers 14a-14e, in relation to the illustration, form a kind of funnel or collar. Furthermore, the detent fingers 14a-14e are equipped with radially inward-pointing detent catches, of which the two illustrated in section in FIG. 3 are designated by the reference symbols 42a and 42c. The detent fingers 14a-14e are elastically deformable, at least in sections, such that they are resiliently bent radially outward when the pin 38 of the component 12 is inserted into the funnel-like upper edge region from above. In the position illustrated in FIG. 3, the pin 38 has already been moved so far down that the detent catches 42a and 42b (and of course the remaining 3 detent catches) spring back into the annular groove 40 of the pin 38.

A ferromagnetic locking element 16 surrounds the cage-like or cup-like arrangement of the detent fingers 14a-14e and is pressed upward in relation to the illustration by a spring element 18 until teeth 48, 50 of the locking element 16 come into contact with the lower side of the housing cover 22, as illustrated. The spring element 18 is formed in the case illustrated as a spiral spring, which also surrounds the cage-like or cup-like arrangement of the detent fingers 14a-14e, wherein the upper spring end is supported on the locking element 16 and the lower spring end on the detent element base plate 32. In the inhibited position of the locking element 16 illustrated in FIG. 3, the locking element 16 inhibits a radially outward movement of the detent fingers 14a-14e, in the illustrated case, by positively surrounding the upper funnel-shaped or collar-shaped edge region of the detent fingers 14a-14e. Before it assumed this inhibited position, the locking element 16 was pushed downward against the spring force when the pin 38 was inserted by the outwardly moving detent fingers 14a-14e. The hemispherical underside of the pin 38 ensures that, when the detent fingers 14a-14e are pressed apart from each other, only minimal frictional losses occur, since there are only linear contact regions.

The detent element 14, the locking element 16 and the spring element 18 are joined together into an assembly by a clip 34, wherein the clip 34 also guides the locking element 16 when it moves, which is explained in more detail below. In any case, the assembly in question is arranged in the housing 20, 22 with lateral clearance, that is, perpendicular to the approach direction of the component 12. The assembly can thus be displaced laterally within the housing, for example, in the form of a centering process when the pin 38 is inserted into the detent element 14. Position tolerances can be compensated to a certain extent in this way.

A damping element 24, which is only indicated schematically in FIG. 3, can be provided between the detent element base plate 32 and the housing base 20 in order to achieve a damping/sound decoupling between the pin 38 and the housing. Corresponding measures can, if necessary, be taken at all contact points between the above-mentioned assembly and the housing 20, 22.

In the illustrated embodiment, the component detent surface 46 (thus the lower groove wall of the annular groove 40) and the detent element detent surfaces (only the detent element latching surface 44a of the detent catch 42a is provided with a reference number) are slanted in such a way that overload protection is provided. If a correspondingly strong upward tensile force acts on the component 12, this leads to the detent fingers 14a-14e moving outward and thereby forcing the locking element 16 downward against the spring force until the detent catches of the detent element 14 come out from the annular groove 40, so that the pin 38 and thus the component 12 is released.

To release the snap-in connection between the holding device 10 and the component 12, an electromagnet 26 approached to the holding device is activated, which electromagnet then generates a magnetic force directed downward on the ferromagnetic locking element 16 with respect to the illustration. By means of this magnetic force, the locking element 16 is moved downward into its release position in relation to the illustration, counter to the spring force exerted by the spring element 18. In the release position (not illustrated in the drawings), the locking element 16 releases the upper region of the detent fingers 14a-14e, so that the detent catches of the detent fingers 14a-14e can be moved outwards by relatively moderate (compared to the overload case explained above) tensile forces engaging on the component 12 directed upwards until detent catches come out of the annular groove 40.

The features of the invention disclosed in the above description, in the drawings and in the claims may be essential for realizing the invention both individually and in any combination.

REFERENCE LIST

10 Holding device
12 Component
14 Detent element
14a-14e Detent fingers
16 Locking element
18 Spring element
20 Housing base
22 Housing cover
24 Damping element
26 Electromagnet
28 First aircraft component
30 Second aircraft component
32 Detent element base plate
34 Clip
36 Cover opening
38 Pin
40 Annular groove
42 Detent catch
42c Detent catch
44 Detent element detent surface
46 Component detent surface
48 Tooth
50 Tooth

The invention claimed is:

1. A holding device for holding a component, with the holding device being convertible from a component holding mode into a component release mode by magnetic force, the holding device comprising: a movable detent element configured to hold the component, a position of which is not influenced by the magnetic force, and a locking element which inhibits a movement of the detent element in the component holding mode in an inhibited position, and which releases the movement of the detent element in the component release mode in a release position.

2. The holding device according to claim 1, wherein the locking element consists of ferromagnetic material at least in sections.

3. The holding device according to claim 1, further comprising a spring element (18) which pretensions the locking element in a direction of the inhibited position.

4. The holding device according to claim 1, further comprising a housing, and the locking element rests against the housing in the inhibited position.

5. The holding device according to claim 1, wherein the detent element is elastically deformable at least in sections.

6. The holding device according to claim 1, further comprising a housing in which the detent element is arranged with clearance in a direction which runs perpendicular to an approach direction with which the component is approached for holding.

7. The holding device according to claim 1, further comprising a housing in which the detent element is arranged, and a damping element between the housing and the detent element.

8. The holding device according to claim 1, wherein the holding device is switchable from the component holding mode to the component release mode without magnetic force and non-destructively when a force which exceeds a predetermined threshold value acts between the component and the detent element.

9. A method for releasing a snap-in connection between a holding device and a component, comprising the following steps:
generating a magnetic field in a vicinity of the holding device; and
applying a force that moves the holding device and the component apart from each other to release the snap-in connection;
wherein a magnetic force is exerted by the magnetic field, and said magnetic force moves a locking element from an inhibited position, in which the locking element inhibits a movement of a detent element, into a release position, in which the locking element releases the movement of the detent element.

10. The method according to claim 9, wherein the locking element is converted from the inhibited position into the release position against a spring force.

11. The method according to claim 9, wherein the detent element is elastically deformed when the connection is released, when the locking element is located in the release position and the force moving the holding device and the component apart from each other is applied.

12. The method according to claim 9, wherein the magnetic field is generated by an electromagnet which is activated to release the connection.

13. The method according to claim 9, wherein the holding device is part of a first aircraft component and the component is part of a second aircraft component.

* * * * *